Dec. 20, 1960 T. C. KNAEBEL ET AL 2,965,350
HERMETICALLY SEALED VALVE MECHANISM
Filed July 11, 1956
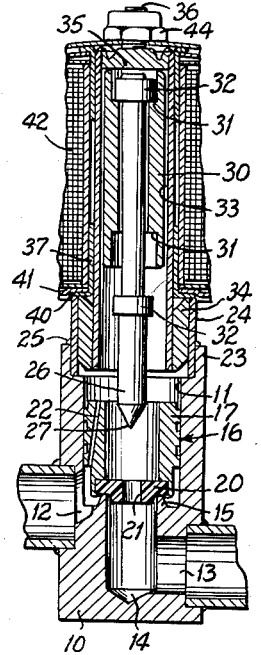
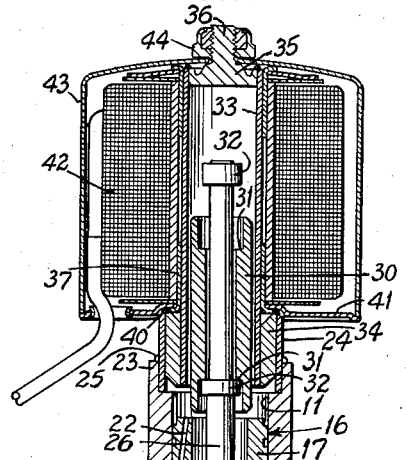
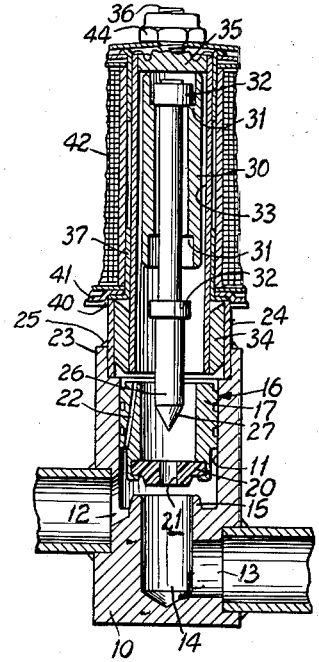
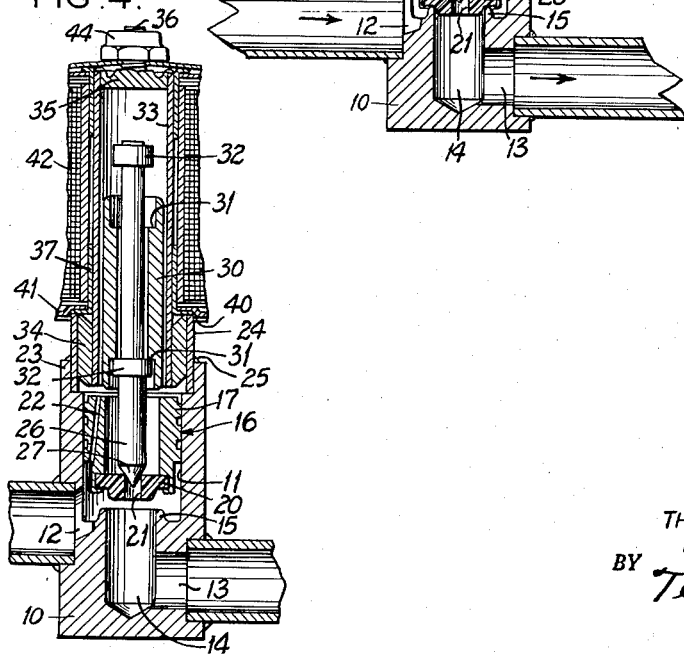
INVENTORS,
THOMAS C. KNAEBEL
BELA DEUTSCH
BY *Terry and Cohn*
ATTORNEYS.

2,965,350
HERMETICALLY SEALED VALVE MECHANISM

Thomas C. Knaebel, Kirkwood, and Bela Deutsch, Ladue, Mo. (both % Standard Machine Manufacturing Co., 8213 Gravois Ave., St. Louis, Mo.)

Filed July 11, 1956, Ser. No. 597,287

1 Claim. (Cl. 251—30)

This invention relates to improvements in a hermetically sealed valve mechanism, and to an improved method of constructing and assembling the component parts of a particular type of valve to afford a hermetically sealed unit.

An important objective of the present invention is realized in the assembled arrangement of valve parts including the use of a collar united to the body and the connection of a housing tube assembly to the valve body by welding an element of such tube assembly to the collar to obtain a hermetically sealed construction. The arrangement is particularly adapted to the provision of a main valve in the valve body, the diameter of which is larger than the internal diameter of the enclosing tube. In previous constructions, the main valve and all other internal elements were introduced into the valve body through the closure tube, and hence were accordingly limited in size by the diameter of such tube.

Another important object is achieved by the provision of a synthetic plastic element carried by the main valve, the element being comprised of a synthetic material such as Teflon or nylon and being formed so that the lower side constitutes a main valve closure and the upper side provides a pilot valve seat.

Still another important objective is provided by the method of constructing and assembling a hermetically sealed valve unit which avoids any possibility of damage such as by distortion or warping of the valve elements upon making the hermetic seals.

Other important advantages are realized by the structural arrangement of the valve mechanism and by the method of construction and assembly in that the tube assembly can be welded to a collar united to the valve body to provide a hermetic seal witthout causing thermal damage to the valve seats and closures. This feature is extremely important particularly when an element of synthetic plastic material is utilized in the main valve to provide such valve seats and closures.

Yet another object is realized by the valve structure in that a steel collar united to a brass valve body can be utilized to retain the tube-housing assembly and can be welded to a steel element of the tube assembly to afford a hermetic seal between the valve body and tube assembly. By making the weld quickly in a hydrogen atmosphere, a hermetic non-porous seal is realized and the valve elements are undamaged by such welding process.

The foregoing and numerous other objects of the invention will more clearly appear from the following detailed description of a preferred embodiment, particularly when considered in connection with the accompanying drawing, in which:

Fig. 1 is a longitudinal cross sectional view of the valve unit showing the main valve, pilot valve and armature in their lowermost position;

Fig. 2 is a cross sectional view similar to Fig. 1, but showing the pilot valve and armature in a raised position relative to the main valve when the magnetic coil is initially energized;

Fig. 3 is a cross sectional view similar to Fig. 2, but showing the main valve in a raised opened position, and Fig. 4 is a cross sectional view similar to that shown in Fig. 3, but showing the pilot valve and armature in a lowered position relative to the main valve upon deenergization of the magnetic coil.

Referring now by characters of reference to the drawing, it is seen that the valve unit includes a valve body 10 constructed of brass, the upper end of body 10 being provided with a cylindrical bore forming an inlet chamber 11. The valve body 10 includes an inlet 12 communicating with chamber 11, an outlet 13 and an interconnecting passage 14. At the lower end of inlet chamber 11, the valve body 10 is formed to provide an upstanding circular ridge about passage 14, the ridge constituting a main valve seat 15.

Located in inlet chamber 11 is a main valve 16 consisting of a tubular wall 17 that slidably engages the walls defining chamber 11, the tubular wall 17 being open at the top. The main valve 16 includes also a lower valve wall represented by a separate plastic element 20, the element 20 being constructed of a synthetic plastic material such as Teflon or nylon. After the plastic element 20 is located to enclose the lower end of tubular wall 17, wall 17 is coined over the peripheral margin of element 20 to hold it in place.

The underside of plastic element 20 is formed to engage contiguously the main valve seat 15 to control the main flow of fluid through passage 14. A pilot valve port 21 is formed centrally of plastic element 20 and aligned with the main valve port defined by valve seat 15. The purpose and advantages of pilot valve port 21 will be fully described subsequently.

For reasons which will appear later in the description of the operation of the valve unit, the tubular wall 17 is provided with a slight clearance with the wall defining inlet chamber 11 to provide a leakage passage that permits a seepage of fluid from the inlet at one side of main valve 16 to the portion of chamber 11 at the other side of main valve 16. Under some operating conditions, there is a tendency for this leakage passage between main valve 16 and valve body 10 to become clogged. In order to assure that there will be a means for passing fluid from the inlet to the upper side of main valve 16 under such conditions, there is provided a by-pass 22 in tubular wall 17 which directly connects the chamber portion at the lower side of main valve 16 with the upper portion of chamber 11 at the other side of main valve 16.

The upper end of inlet chamber 11 is enlarged and defined by circular body flange 23. A steel collar 24 is located within body flange 23 and is united to brass body flange 23 by brazing or soldering 25, such uniting operation being completed before final machining of valve seat 15.

Disposed internally of main valve 16 is a pilot valve 26 having a pointed nose 27 at the lower end of the valve stem. The pointed stem nose is adapted to interfit the pilot valve port 21 formed in plastic element 20 and is adapted to control the flow of fluid from the upper chamber portion at one side of main valve 16 into passage 14 connected to outlet 13.

Thus it is seen that the underside of plastic element 20 is adapted to provide a main valve closure, and the upper side is adapted to provide a pilot valve seat. By utilizing the plastic element 20 the main valve 16 can be constructed simply of two parts, i.e. the tubular wall 17 and plastic element 20.

A movable armature 30 is located about pilot valve 26, the armature 30 having upper and lower abutments 31 adapted to engage spaced shoulders 32 formed on the valve stem. To realize a more positive actuation of pilot valve 26, the armature 30 is permitted to move a slight distance to gain momentum before striking the valve stem. For this reason the distance between abutments 31 on armature 30 is less than the distance between shoulders 32 on pilot valve 26.

The tube assembly adapted to enclose the upper end of chamber 11 includes a steel tube 33 having an enlarged base shoulder 34 united to its lower end. Before the tube assembly is connected to valve body 10, the upper end of steel tube 33 is closed by a cap 35 welded to the upper rim of tube 33. The cap 35 includes an upstanding threaded stud 36.

In assembling the valve parts, the pilot valve 26 and armature 30 are disposed on main valve 16 which is located in chamber 11, and then tube 33 is placed over the pilot valve 26 and armature 30. The base shoulder 34 is press-fitted into steel collar 24 until the upper end of shoulder 34 is adjacent the upper end of collar 24. A steel sleeve 37 is located about steel tube 33 and moved downwardly against base shoulder 34, the lower end of sleeve 37 being located adjacent the upper ends of shoulder 34 and collar 24. At that time the steel sleeve and steel collar are welded together as indicated at 40 to provide a hermetic seal between valve body 10 and the tube assembly.

The weld 40 is quickly made in a hydrogen atmosphere to provide a non-porous seam and to prevent distortion or damage to the plastic valve element 20 or to the machined valve seat 15. It is only by the inclusion of a steel collar 24 that had previously been united to brass valve body 10, and the location of such collar 24 to a steel element of the tube assembly that a fast weld of this nature can be made to provide a hermetic seal without causing any damage to the valve seats and closures. The use of a hydrogen atmosphere in making the weld provides a non-porous seam and enables such weld to be made quickly in the absolute minimum of time so that the heat is not capable of being transmitted to the valve elements and accurately machined internal parts but rather is concentrated at the weld region and readily dissipated into the air. From the above description it is apparent that the valve unit is completely hermetically sealed.

Located about steel tube 33 and supported by its base shoulder 34 is a housing plate 41. Located about tube 33 is a magnetic coil 42 supported by base shoulder 34 and by housing plate 41. A housing structure 43 is disposed over magnetic coil 42 and is supported by lower housing plate 41, the housing structure 43 being fastened to the tube assembly by a nut 44 that threadedly engages stud 36 of cap 35 extending through the upper portion of housing structure 43.

In operation, assume that the component parts of the valve unit are shown in initial at-rest position in Fig. 1. Fluid under pressure enters inlet 12 and leaks upwardly between main valve 16 and valve body 10 and leaks through by-pass passage 22 until the chamber 11 above plastic valve element 20 is at inlet pressure.

Energization of the magnetic coil causes the armature 30 to be drawn upwardly so that abutment 31 engages the upper shoulder 32 of pilot valve 26, the armature 30 lifting the pilot valve 26 to unseat the pointed nose 27 from the pilot valve port 21. During this operation the armature 30 and pilot valve 26 are moved upwardly from the position shown in Fig. 1 to the position shown in Fig. 2.

At this stage the pilot valve port 21 is open, thus allowing fluid to exhaust or flow from the upper portion of chamber 11 into the valve passage 14. Because the effective area of pilot valve port 21 is substantially greater than the effective area of the leakage passage between main valve 16 and valve body 10 and the effective area of by-pass 22, the fluid exhausts through pilot valve port 21 at a rate faster than it can be introduced through such leakage passages. Thus, the pressure above plastic valve element 20 is reduced. Consequently, the greater pressure below main valve 16 causes the valve 16 to be raised and hence causes a direct connection between inlet 12 and outlet 13 since plastic valve 20 is unseated from valve seat 15. It is seen that main valve 16 moves upwardly from the position shown in Fig. 2 to the position shown in Fig. 3.

To close the valve unit, the magnetic coil 42 is de-energized which causes armature 30 and pilot valve 26 to descend from the position shown in Fig. 3 to the position shown in Fig. 4. In this position, the pilot valve 26 closes the pilot valve port 21 in plastic valve element 20. With pilot valve port 21 closed, the fluid at inlet pressure leaks between main valve 16 and valve body 10 and through by-pass 22 until the increased pressure above main valve 16 presses the main valve downwardly to the initial position shown in Fig. 1 in which plastic valve element 20 engages valve seat 15 to close off the valve.

Although the invention has been described my making detailed reference to a single preferred embodiment, and to a preferred method of constructing and assembling a hermetically sealed valve unit, such detail is to be understood in an instructive, rather than in any restrictive sense, many variants being possible within the scope of the claim hereunto appended.

We claim as our invention:

In a hermetically sealed valve construction including a brass body having a chamber open at the top, the body having an inlet and an outlet and an interconnecting passage, a main valve slidably disposed in said chamber and arranged to control flow through said passage, a steel collar located at the top of said chamber and united to said brass body to provide a hermetic seal, a tube assembly including a tubular member open at the bottom, the tubular member being of smaller internal dimension than the diameter of the main valve, a shoulder united to said tubular member and arranged to interfit tightly said collar, a steel element located about and sealed to said tubular member, the steel element being welded to said steel collar to provide a hermetic seal between said body and tube assembly, a pilot valve slidably disposed in said tubular member and arranged to coact with said main valve, a cap element welded to the top of said member to provide a hermetic seal, and a magnetic collar about said member to actuate said pilot valve.

References Cited in the file of this patent

UNITED STATES PATENTS

| | | |
|---|---|---|
| 1,303,892 | Harris | May 20, 1919 |
| 1,513,824 | Kasley | Nov. 4, 1924 |
| 2,084,030 | Hoppe | June 15, 1937 |
| 2,209,709 | Weatherhead | July 30, 1940 |
| 2,251,441 | Dillman | Aug. 5, 1941 |
| 2,335,923 | Dube | Dec. 7, 1943 |
| 2,343,806 | Scofield | Mar. 7, 1944 |
| 2,379,181 | Pontius | June 26, 1945 |
| 2,404,157 | Ahalt | July 16, 1946 |
| 2,478,040 | Campbell | Aug. 2, 1949 |
| 2,589,574 | Ray | Mar. 18, 1952 |
| 2,604,905 | Myer | July 29, 1952 |